United States Patent Office 3,504,296
Patented Mar. 31, 1970

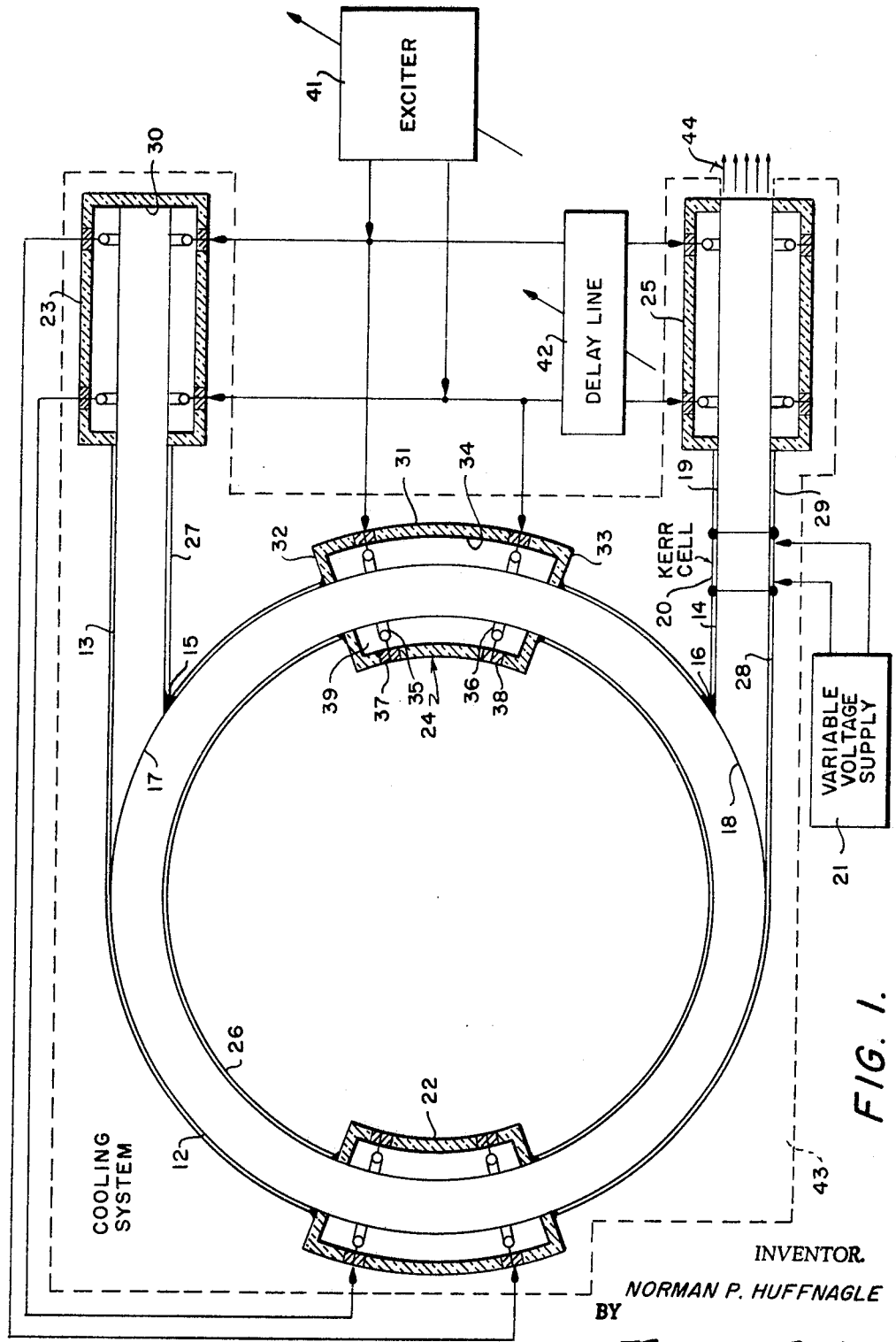

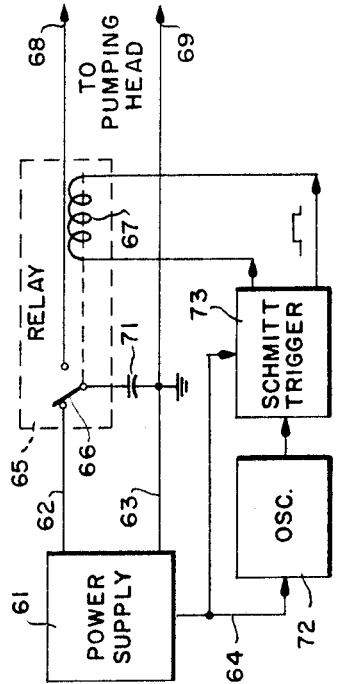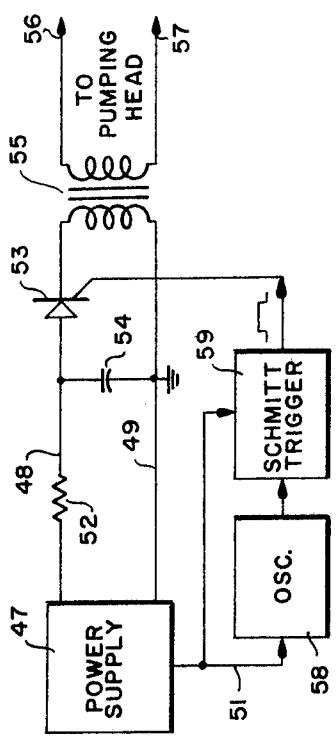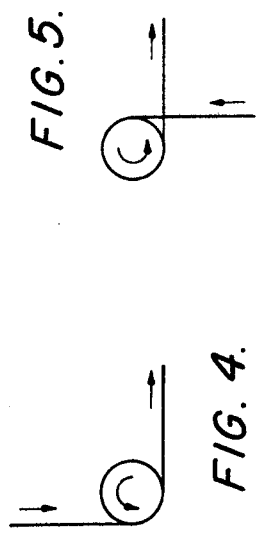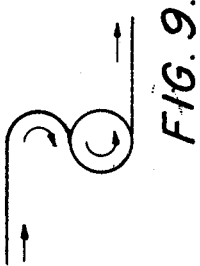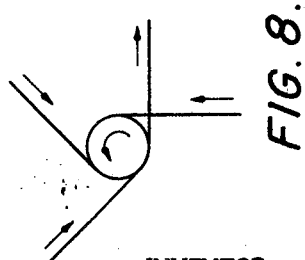

3,504,296
LIGHT SYNCHROTRON
Norman P. Huffnagle, Box B-4, 607 W. 11th St.,
Panama City, Fla. 32401
Filed Oct. 20, 1965, Ser. No. 499,106
Int. Cl. H01s 3/00
U.S. Cl. 331—94.5    14 Claims The invention described herein may be manufactured and used by or for the Government of the United States of America for governmental purposes without the payment of any royalties thereon or therefor.

The present invention relates generally to collimated light sources and in particular is a cyclical energy multiplication means for the amplification of collimated light. In even greater particularity, it is an improved method and means for increasing the useful energy yields of lasers and the like.

In the past, the light amplifiers of the prior art rely mainly on the "one-shot" procedure. In that procedure, the total energy input is applied to a suitable laser rod as a single pulse, and then the coherence principle inherent in laser operation is depended upon to effect the amplification. Unfortunately, such procedure has some adverse limitations and, although useful for some purposes, usually leaves a great deal to be desired. For example, one of the disadvantages of such prior art is that the transit time of the photon beams is much smaller than the recycling time in large power arrays. Another disadvantage is, in order to contain the light energy in the laser rod, the silvered ends thereof must be made almost opaque, and this tends to cause an excessive loss of energy at the ejection surface end.

For many practical purposes, the instant invention overcomes most of the aforementioned disadvantages and, thus, provides a collimated light source which is an improvement over the prior art.

It is, therefore, an object of this invention to provide an improved laser system.

Another object of this invention is to provide an improved method and means for amplifying the light energy output of a laser material.

Still another object of this invention is to provide an improved method and means for energizing a laser rod.

Another object of this invention is to provide a laser system having a continuous collimated energy beam output or a pulsed collimated energy beam output.

Another object of this invention is to provide an improved method and means for containing light energy beams until larger energy levels can be obtained.

Another object of this invention is to provide an improved laser pumping system.

A further object of the invention is to provide a new and useful laser rod geometrical configuration.

Other objects and many of the attendant advantages will be readily appreciated as the subject invention becomes better understood by reference to the following detailed description when considered in conjunction with the accompanying drawings wherein:

FIG. 1 is a schematic view of the invention with some elements illustrated in cross-section and other elements depicted in block diagram form;

FIG. 2 is a combination block and schematic diagram illustrating an exemplary exciter that may be used as the exciter of FIG. 1;

FIG. 3 is, likewise, a combination block and schematic diagram illustrating another exemplary exciter that may be used as the exciter of FIG. 1; and FIGS. 4 through 11 are respective schematic diagrams of exemplary circular and straight laser rod assembly configurations that may be incorporated in the subject invention.

Referring now to FIG. 1, a preferred embodiment 11 of the subject invention is shown as having a circular laser rod 12. Extending tangentially from the periphery thereof is another laser rod 13 having a straight geometrical configuration. Another straight laser rod 14 likewise extends tangentially from the diametrically opposed periphery of the aforesaid circular laser rod 12 in parallel disposition with straight laser rod 13. Junctions 15 and 16 occurring respectively between laser rods 12 and 13 and 12 and 14 each contain silvered semi-mirror surfaces 17 and 18 therebetween, with the reflecting surfaces thereof directed internally within circular laser rod 12. Each of the aforesaid straight laser rods 13 and 14 are preferably attached to circular laser rod 12 by means of peripheral fusing or any other conventional laser rod joining procedures.

Another laser rod 19 having a straight geometrical configuration is disposed in alignment with laser rod 14. Mounted between adjacent ends of said laser rods 14 and 19 is a Kerr cell 20. Again, attachment thereof may be effected by fusing or any other suitable conventional attachment means as appropriate under the circumstances. Kerr cell 20, itself, is a conventional and commercially available item which acts as a variable light valve when the proper voltage is supplied thereto by a variable voltage supply 21. Because Kerr effect cells are sometimes considered as including Pockel's effect and, thus, may be crystaline in nature (composed of ammonium dihydrogen phosphate or potassium dihydrogen phosphate), the amount of impedance to light energy effected thereby is directly proportional to the control voltage supplied thereto. In the alternative, in event an open or closed light valve is sufficient during any operational circumstances, a conventional Q-spoiler may be substituted for the aforesaid Kerr cell 20.

Laser rods 12, 13, 14, and 19 may be made of any appropriate laser material. Calcium fluoride ($C_aF_2$) has been found to be satisfactory for this purpose; however, if so desired, said laser rods may be made from glass doped with neodymium ($Nd^{++}$) dysprosium ($Dy^{++}$).

A plurality of light pumps 22 through 25 are contiguously disposed around various sections of the aforementioned laser rods in such manner that energization thereof will be effected. Although any desired number thereof having suitable lengths may be used for this purpose, as shown in FIG. 1, four thereof have been found to operate satisfactorily when disposed as indicated.

With the exception of these sections of laser rods 12, 13, 14 and 19 that are respectively disposed within pumping heads 22 through 25, the respective external peripherical surfaces thereof are silvered or otherwise coated in such manner that mirror-type reflective surfaces 26 through 29 are integrally attached thereto. These reflective surfaces are, of course, directed toward their respective laser rod interiors, so that any light energy present will be contained therein.

Fundamentally, light pumps 22 through 25 are substantially similar in both structure and function. However, as may readily be seen, they may be constructed to either have straight or arcuate geometrical configurations in order to be compatible with their associated laser rod configurations. Light pump 23 may, for instance, be similar to that described in patent application Ser. No. 379,056, entitled Optical Maser, filed June 29, 1964, by Norman P. Huffnagle. Light pumps 22, 24, and 25 differ from light pump 23 in only one respect—that is, their respective laser rods 12 and 19 extend through them completely while laser rod 13 terminates within light pump 23 at a silvered mirror surface end 30.

In view of the similarities of structure of light pumps 22 through 25, the structure of only one, namely light pump 24, will be discussed in detail in order to provide simplicity of disclosure. Pumping head 24 has a hollow tubular glass section 31 with glass ends 32 and 33 attached thereto and to laser rod 12 as by fusing, where laser rod 12 extends therethrough. A silvered mirror surface 34 is coated or otherwise disposed upon the entire inner surface of head 24. A pair of ring electrodes 35 and 36 are respectively mounted in insulators 37 and 38 which, in turn, are appropriately mounted within said pumping head glass sections. Ring electrodes 35 and 36 are also disposed in contiguous surrounding relationship with laser rod 12. The pumping head is filled with an ionizable gas 39 which produces an appreciable spectral output that falls within the frequency bandwidth of the laser material used in the laser rods. For this purpose, a single low pressure gas, such as, for example, mercury vapor, may be used. As an alternative, an ionizable gaseous mixture of 40% helium, 40% argon, 19% mercury, and 1% xenon by volume may be used for this purpose, too.

Those sections of laser rods 12, 13, and 19 which are located within the respective pumping heads do not have their peripherial surfaces silvered or coated with mirror material, although, as previously mentioned, the other outer surfaces thereof are so covered. Hence, light generated within the ionizable gas of the pumping heads will readily pass into the laser rods when the frequency thereof falls within the pumping frequency range of the laser material used.

It should be understood that the radius of curvature of the circular laser rod portion of this invention may be that which is warranted by the operational circumstances involved at any particular time. Nevertheless, it appears that a radius of approximately one foot produces satisfactory results. Likewise, the length of the aforesaid straight laser rod sections 13, 14, and 19 may be whatever is necessary to provide optimum operation. Furthermore, although the presently discussed embodiment depicts said straight laser sections as being mounted tangentially and at diametrically opposed positions on the circular portions thereof and in parallel disposition with each other, it should be understood that other arrangements may be employed without violating the spirit and scope of this invention, inasmuch as so doing would be well within the purview of one skilled in the art having the benefit of the teachings herewith presented.

In order to energize the laser rods of this invention, an exciter 41 is employed. The output voltages thereof are electrically connected in parallel to the electrodes of each of the aforesaid pumping heads 22 through 25. For reasons which will be explained subsequently during the discussion of the operation of this invention, a delay line 42 is connected between exciter 41 and pumping head 25. Delay line 42, of course, may be any one of many conventional delay lines that may appropriately be used for this purpose. An exemplary one which will operate satisfactorily in this invention may, for instance, be purchased commercially from AD–YU Electronics, Inc., of Passaic, N.J.

A cooling system 43 is preferably used in conjunction with this invention in order to keep the entire system below the thermal avalanche region and thereby prevent damage to the laser rods and their co-acting elements. For this purpose, any conventional refrigeration type system which contains a heat exchange arrangement that is compatible with the structure herein described is considered to be satisfactory. For many practical purposes, the invention may simply be enclosed within the cooling section of an appropriate refrigeration system. On the other hand, if warranted by operational circumstances, a special customized configuration may be used, so as to provide greater cooling efficiency. This being a matter of design choice, the selection thereof is left to the artisan and, consequently, it is only disclosed symbolically herein.

FIG. 2 discloses an exemplary exciter which may be used as exciter 41 in the device of FIG. 1. It includes a power supply 47 having a high voltage output 48, a ground 49, and a low voltage output 51. The high voltage output thereof is coupled through a resistor 52 to the anode of a silicon controlled rectifier 53. A capacitor 54 is connected between the junction of said resistor 52 and rectifier 53 anode and ground. A transformer 55 has its primary winding connected between the cathode of silicon controlled rectifier and ground, and the secondary winding thereof is connected to exciter output terminals 56 and 57 which, of course, are adapted for being connected to the electrodes of the aforementioned pumping heads of FIG. 1. An oscillator 58, whose frequency may be varied manually as desired, has its output connected to the input of a Schmitt trigger 59 which, in turn, has its output coupled to the gate of the aforesaid rectifier 53. Oscillator 58 and Schmitt trigger 59 are also connected to power supply 47 in such manner as to receive electrical power therefrom.

FIG. 3 likewise discloses an exciter circuit which may be used as exciter 41 in the device of FIG. 1. It includes a power supply 61 having a high voltage output 62, a ground 63, and a low voltage output 64. Inserted in high voltage line 62 is a relay 65 having a double-pole-single-throw switch 66 that is actuated by inductance coil 67. Swith 66 normally has the contact connected to the power supply closed with the movable arm contact; hence, energization of coil 67 causes the movable arm thereof to make connection with the other switch contact. Said other contact of switch 66 and said ground 63 are respectively connected to output terminals 68 and 69, which, of course, are adapted for being coupled to the electrodes of the pumping heads of FIG. 1.

A capacitor 71 is connected between the movable arm of relay switch 66 and ground.

An oscillator 72 has its output coupled to a Schmitt trigger 73 which, in turn, has its output connected to the aforesaid inductance coil 67 of relay 65 for timely energization thereof.

In vew of the fact that this particular embodiment of the exciter incorporates an electromechanical element, viz., relay 65, which is somewhat slower acting than the comparable electronic switching element of FIG. 2, it is not absolutely necessary that Schmitt trigger 73 be included therein. It, therefore, should be considered as optional, depending on the operational circumstances. Of course, if Schmitt trigger 73 is omitted, the outputs of oscillator 72 are appropriately connected to relay coil 67 for timely energization thereof.

Considering now FIGS. 4 through 11, there is shown respectively therein laser rod assemblies which uniquely combine curved and straight laser rod configurations with circular laser rod configurations. These laser rod assemblies are herewith disclosed as examples of operable laser rod configurations, with the understanding that numerous others also exist which would be obvious to one skilled in the art having the benefit of the teachings herewith presented.

These laser rod configurations, of course, are constructed in a manner similar to that described in connection with the device of FIG. 1. Therefore, although not shown, in order to keep this disclosure as simple as possible, the appropriate pumping heads are mounted thereon as necessary and as desired to provide energization of each of the laser rod elements. Also, the silvering thereof, either total or semi at the respective junctions, for effecting appropriate light energy containment and transfer, should be considered as being included therewith. Also cooling systems, light gates, delay lines, and exciters, etc., may also be suitably combined therewith in accordance with the teachings of the device of FIG. 1.

Although preferred, it is not absolutely necessary that the circular laser rods be exactly circular. They may be oval or elliptical or some other configuration which curves back upon itself so as to provide a continuous light path. Likewise, the aforementioned so-called straight solid laser rods may be somewhat bent or otherwise formed to suit operational circumstances or ambient environmental conditions.

Furthermore, although lased rod elements are preferably joined so that the straight rods extend tangentially from the circular rods to effect minimum restrictive interference therebetween, other angular junctions may be used, if so desired, without violating the spirit and scope of this invention.

Briefly, the operation of this invention will now be discussed in conjunction with all figures.

As exciter 41 supplies selected high voltages of predetermined values to each of pumping heads 22 through 25, the gas or gases contained therein are ionized sufficiently to produce light energy in the frequency range of the laser material used. Hence, inasmuch as laser rods 12, 13, and 19 are not silvered in their respective heads, they are timely energized by the light generated therein. Pumping head 23 is actually an injector head that is terminated in a totally reflective end, and it also acts as a resonator of non-critical dimensions. It, therefore, serves to produce a high concentration of photons in the ring portion of the laser rod assembly. This occurs because the beam of photons from pumping head 23 contains enough energy to make it capable of travelling across partially silvered surface 17, where the end of laser rod 13 is joined to laser ring 12. Because the reflective mirror surface of partially silvered surface 17 is directed within laser ring 12, it is easier for photons to travel from straight laser rod 13 into ring laser rod 12 than from ring laser rod 12 into straight laser rod 13. Because laser rod 13 is tangentially connected to ring laser rod 12, the photon transfer therebetween occurs without excessive energy loss due to the junction per se, inasmuch as the direction of travel of the photons at that point does not have to change. Of course, semi-mirror 17 presents some impedance to such photon transfer, but once the energy level is high enough as a result of the pumping affect of pumping head 23, transfer is easily effected.

Energy is also simultaneously pumped into the circular laser by pumping heads 22 and 24, but even though the initial direction of the light energy is omnidirectional, the stream of light energy from injector head 23 forces the added energy to circle the laser ring in a counterclockwise direction, inasmuch as it provides a continuous light path therefor.

When the energy of the light in laser ring 12 reaches a certain equilibrium level, it will pass through partially silvered semimirror surface 18 into straight laser rod 14. In event Kerr cell is in an open gate condition, said light energy will continue on through laser rod 19, where additional and final energy may be timely imparted thereto by pumping head 25. This final energy boost causes the energy to leave the end of laser rod 19 as a collimated beam of light 44. It is above stated that additional energy may be timely imparted to laser rod 19 because, for many practical purposes, pumping head 25 is optional. Hence, although preferable as disclosed in this embodiment, pumping head may be omitted where operational circumstances so warrant.

In event it is desired that the effluent collimated energy level be larger than it ordinarily would be, Kerr cell 22 may be closed by applying the proper voltage thereto until such time as the new closed system builds up to its maximum possible energy condition.

Although the particle velocity of photons cannot be increased because they already travel at the speed of light, the cumulative energy thereof is increased as a result of the structural configuration constituting this invention. As a matter of fact, the subject device allows energy multiplication to occur that is considerably above that obtained from single or multiple cavity resonators.

Delay line 42 has been included in the preferred embodiment of this invention in order to delay the effectiveness of pumping head 25 until such time as the remainder of the laser rod assembly, including laser rods 12, 13, and 14, has reached a predetermined equilibrium energy level as a result of energization thereof by pumping heads 22, 23 and 24 and the circulation and recirculation of the light energy therein. The amount of delay employed, of course, depends on the type of materials used in the laser rods, the gas used in the pumping heads, and the amount of light energy desired to be contained in and emitted from the entire laser rod assembly during any given operational circumstances. As pumping head 25 timely receives electrical power from exciter 41, it in turn, adds energy to the light being emitted from the open end surface of laser rod 19.

Although preferred in the subject embodiment, delay 42 is optional in actual practice, inasmuch as the invention will operate for many practical purposes without it.

The operation of the device of FIG. 2 is very simple. Capacitor 54 charges through resistor 52 when silicon controlled diode 53 is gated to be non-conductive. When it is gated to be conductive, capacitor 54 then discharges through the primary winding of transformer 55, thereby supplying a high voltage to the pumping head electrodes for the energization of the ionizable gas therein. The silicon controlled gating is effected by the square-wave positive voltage supplied by Schmitt trigger 59, the frequency of which is controlled by oscillator 58. Because the frequency of oscillator 58 is manually adjustable, the energization of pumping heads 22 through 25 may be regulated to provide optimum performance.

The exciter circuit of FIG. 3 operates essentially the same way the device of FIG. 2 operates. Capacitor 71 is charged through the left-hand contacts of relay switch 66, which is normally closed until opened by the energization of inductance coil 67. When said coil 67 is energized, capacitor 67 discharges through the now-closed right hand contacts of relay switch 66 to the load, which, in this case, is the pumping heads of the device of FIG. 1. Of course, inductance 67 is energized by Schmitt trigger 73 which, in turn, is actuated and controlled at a manually adjustable frequency by oscillator 72. As previously suggested, in this particular arrangement, coil 67 may be energized by the output sinewave signal from oscillator 72, if so desired. Hence, Schmitt trigger 73 is optional.

Although the preferred embodiment of this invention, as it is disclosed in FIG. 1, operates satisfactorily for most practical purposes, in event space or other considerations become of paramount importance, other geometrical configurations which incorporate one or more of the rod assembly embodiments illustrated in FIGS. 4 through 11 may be used to provide optimum performance during any predetermined operational circumstances.

The laser rod assemblies of FIGS. 4 through 11 each operate the same way the laser rod assembly of FIG. 1 works. When properly energized in the manner previously mentioned, the light energy tends to travel within the solid laser rods in the directions represented by the arrows. Hence after reaching a certain total energy level, collimated light is emitted from the end of one of the rod elements thereof.

Obviously, other modifications of this embodiment or other embodiments of the subject invention will readily come to mind of one skilled in the art having the benefit of the teachings presented herein in accompaniment with the associated drawings. Therefore, it is to be understood that the invention is not to be limited thereto and that said modifications and other embodiments are intended to be included within the scope of the appended claims.

What is claimed is:

1. A light synchrotron comprising in combination:
   a circular laser rod,
   a straight laser rod joined to said circular laser rod at the periphery thereof along a line tangent thereto,
   means coated upon predetermined portions of the external curved surfaces of asid circular and straight laser rods for reflecting light energy therewithin, and
   pumping means contiguously disposed about uncoated surface portions of said circular and straight laser rods for the energization thereof.

2. A radiant energy synchrotron comprising in combination:
   a solid laser rod having a substantially circular geometrical configuration,
   a substantially straight solid laser rod joined to the periphery of said circular laser rod and extending along a line tangent thereto,
   a semi-mirror surface coated to the periphery of the aforesaid solid circular laser rod where said substantially straight solid rod is joined thereto,
   mirror means coated to predetermined external surface portions of said circular and straight laser rods for reflecting radiant energy within the frequency spectrum thereof in such manner that it is contained therein,
   pumping means contiguously disposed with predetermined uncoated surface portions of said circular and straight laser rods for the timely energization thereof.

3. A light synchrotron comprising in combination:
   a circular laser rod having a continuous light path,
   a first straight laser rod having one end thereof connected to the periphery of said circular laser rod,
   means attached to the other end of said first straight laser rod for reflecting light energy therewithin toward said circular laser rod,
   a second straight laser rod having one end thereof connected to the periphery of said circular laser rod and the other end thereof terminated for emitting the light energy contained therewithin,
   a first light energy pumping head contiguously disposed around a predetermined arcuate section of said circular laser rod for the energization thereof, and
   a second light energy pumping head contiguously disposed around a predetermined straight section of said first straight laser rod for energization thereof.

4. The invention according to claim 3 further characterized by means coated on predetermined portions of the external curved surfaces of each of said laser rods for reflectively containing light energy therein.

5. A light synchrotron comprising in combination:
   a circular laser rod,
   a first straight laser rod having one end thereof connected to the periphery of said circular laser rod,
   means coated to the other end of said first straight laser rod for reflecting light energy in such manner as to reflect it back therewithin,
   a second straight laser rod having one end thereof connected to the periphery of said circular laser rod and the other end thereof terminated for emitting the light energy contained therewithin,
   first means mounted on an arcuate section of said circular laser rod for the energization thereof,
   second means mounted on a section of said first straight laser rod for the energization thereof, and
   third means mounted on a section of said second straight laser rod for the energization thereof.

6. A light synchrotron comprising in combination:
   a first laser rod having a continuous light path,
   a second laser rod having a light path, with one end thereof connected to said first laser rod in such manner that light energy will travel therebetween, and with the other end thereof terminated for emitting light energy contained therein,
   means mounted on said first laser rod for the energization thereof, and
   means mounted on said second laser rod for the energization thereof.

7. A light synchrotron comprising in combination:
   a first laser rod having a continuous light path,
   a second laser rod having a light path, with one end thereof connected to said first laser rod for light transmission therebetween, and with the other end thereof terminated for emitting the light energy contained therein,
   a third laser rod having a light path, with one end thereof connected to said first laser rod for light transmission therebetween,
   means attached to the other end of said third laser rod for terminating the transmission of light energy thereat,
   means connected to the other end of said second laser rod for adjusting the amount of light energy emitted therefrom,
   a fourth laser rod having a light path, with one end thereof connected to said light energy adjusting means, and the other end thereof terminated for emitting the light energy contained therein,
   means connected to said first, second, and fourth laser rods for the energization thereof, and
   means coated on predetermined portions of the external surfaces of said first, second, third, and fourth laser rods for containing the light energy existing therein.

8. The invention according to claim 7 further characterized by a cooling system contiguously disposed with the aforesaid laser rods and laser rod energization means for controlling the temperature thereof.

9. A laser system comprising in combination:
   a circular laser rod having a continuous light path,
   a first straight laser rod having one end thereof connected to the periphery of said circular laser rod in such manner that said first straight laser rod extends along a line tangent thereto,
   a second straight laser rod having one end thereof connected to the periphery of said circular laser rod at a location thereon diametrically opposed to the connection of the aforesaid first laser rod and connected thereto in such manner that said second straight laser rod extends along a line tangent thereto and in parallel disposition with said first laser rod,
   a first laser pumping head mounted on said first straight laser rod for the energization thereof,
   a second laser pumping head mounted on said second straight laser rod for the energization thereof,
   a plurality of laser pumping heads mounted on said circular laser rod for the energization thereof,
   a first inwardly directed semi-mirror coating disposed on the periphery of said circular laser rod where said first straight laser rod is connected thereto,
   a second inwardly directed semi-mirror coating disposed on the periphery of said circular laser rod where said second straight laser rod is connected thereto,
   an inwardly directed full mirror coating attached to the external curved surfaces of said first, second, and circular laser rods not occupied by the aforesaid laser pumping heads, and
   another full mirror coating attached to the flat end surface of the other end of the aforesaid first straight laser rod.

10. The invention according to claim 9 further characterized by a means contiguously disposed with said laser rods and said laser pumping heads for the cooling thereof.

11. The invention according to claim 9 further characterized by an exciter connected in electrical parallel to each of the aforesaid laser pumping heads.

12. The invention according to claim 11 further characterized by a delay line connected between said exciter and the aforesaid second laser pumping head.

13. The invention of claim 9 further characterized by means effectively interposed between said circular laser rod and said second straight laser rod for regulating the amount of light energy that passes therebetween.

14. The device of claim 13 wherein said means effectively interposed between said circular laser rod and said second laser rod for regulating the amount of light energy that passes therebetween comprises:

a Kerr cell, and
a variable voltage supply connected to said Kerr cell for adjusting the light passing capabilities thereof.

References Cited

UNITED STATES PATENTS

| | | | |
|---|---|---|---|
| 3,102,920 | 9/1963 | Sirons | 331—94.5 |
| 3,140,451 | 7/1964 | Fox | 331—94.5 |
| 3,222,615 | 12/1965 | Holly | 331—94.5 |
| 3,354,405 | 11/1967 | Bebb et al. | 331—94.5 |

RONALD L. WIBERT, Primary Examiner